United States Patent
Speller

(10) Patent No.: US 11,008,113 B2
(45) Date of Patent: May 18, 2021

(54) CLUTCH WITH SYNCHRONIZER AND LOCKING MECHANISM

(71) Applicant: Bell Helicopter Textron Inc., Fort Worth, TX (US)

(72) Inventor: Charles Hubert Speller, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 337 days.

(21) Appl. No.: 16/035,409

(22) Filed: Jul. 13, 2018

(65) Prior Publication Data

US 2019/0023410 A1  Jan. 24, 2019

Related U.S. Application Data

(60) Provisional application No. 62/535,933, filed on Jul. 23, 2017.

(51) Int. Cl.
| | |
|---|---|
| *F16D 23/04* | (2006.01) |
| *B64D 35/00* | (2006.01) |
| *B64C 11/28* | (2006.01) |
| *B64C 29/00* | (2006.01) |
| *F16D 23/06* | (2006.01) |
| *F16D 25/0632* | (2006.01) |
| *F16D 25/061* | (2006.01) |
| *B64C 27/12* | (2006.01) |
| *B64C 27/30* | (2006.01) |

(52) U.S. Cl.
CPC ............. *B64D 35/00* (2013.01); *B64C 11/28* (2013.01); *B64C 27/12* (2013.01); *B64C 27/30* (2013.01); *B64C 29/0033* (2013.01); *F16D 23/04* (2013.01); *F16D 23/06* (2013.01); *F16D 25/061* (2013.01); *F16D 25/0632* (2013.01); *F16D 2023/0693* (2013.01)

(58) Field of Classification Search
CPC ..... B64D 35/00; F16D 23/06; F16D 25/0632; F16D 25/061; F16D 23/04; F16D 2023/0693; B64C 27/12; B64C 27/30; B64C 11/28; B64C 29/0033
See application file for complete search history.

(56) References Cited

U.S. PATENT DOCUMENTS

| | | | |
|---|---|---|---|
| 2009/0272212 A1* | 11/2009 | Raszkowski | F16H 3/097 74/331 |
| 2016/0160938 A1* | 6/2016 | Wooden | F16D 25/12 192/69.5 |
| 2016/0348735 A1 | 12/2016 | Beckner et al. | |
| 2017/0016486 A1* | 1/2017 | Damm | F16D 23/06 |
| 2017/0114839 A1* | 4/2017 | Zhong | F16D 23/06 |

* cited by examiner

*Primary Examiner* — David J Hlavka
(74) *Attorney, Agent, or Firm* — Lightfoot & Alford PLLC

(57) ABSTRACT

A clutch that has a synchronizer for matching a rotational velocity of a drive input with a rotational velocity of a driven output prior to engagement of a locking mechanism.

9 Claims, 7 Drawing Sheets

CLUTCH WITH SYNCHRONIZER AND LOCKING MECHANISM

CROSS-REFERENCE TO RELATED APPLICATIONS

The present application claims the benefit of Provisional Application No. 62/535,933, filed Jul. 23, 2017, which is incorporated herein by reference in its entirety.

GOVERNMENT LICENSE RIGHTS

This invention was made with government support under Agreement No. W911W6-16-2-0011 awarded by The Department of the Army for the Adaptive Vertical Lift Engine ("AVLE") Program. The government has certain rights in the invention.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that generates the lift force to support the aircraft in flight. Fixed-wing aircraft, however, typically require a runway that is hundreds or thousands of feet long for takeoff and landing.

Unlike fixed-wing aircraft, vertical takeoff and landing ("VTOL") aircraft do not require runways. Instead, VTOL aircraft are capable of taking off, hovering and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward, and lateral flight. These attributes make helicopters highly versatile for use in congested, isolated, or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing, with each nacelle housing a propulsion system that provides torque and rotational energy to a proprotor. The nacelles are rotatable relative to the fixed wing such that the proprotors have a generally horizontal plane of rotation providing vertical thrust for takeoff, hovering, and landing, much like a conventional helicopter, and a generally vertical plane of rotation providing forward thrust for cruising in forward flight with the fixed wing providing lift, much like a conventional propeller-driven airplane. It has been found, however, that forward airspeed-induced proprotor aeroelastic instability is a limiting factor relating to the maximum airspeed of tiltrotor aircraft in forward flight.

In order to provide an aircraft with the versatility of a VTOL aircraft with the range and speed of a conventional airplane, a tiltrotor aircraft having rotary and non-rotary flight modes has been disclosed in U.S. patent application Ser. No. 15/428,687, which is incorporated herein by reference in its entirety. The aircraft described therein is operable in three different modes: (1) helicopter mode, (2) proprotor-driven airplane mode, and (3) jet-powered airplane mode. Both helicopter mode and proprotor-driven airplane mode are rotary flight modes which are powered by an engine in a turboshaft mode, wherein the engine provides torque and rotational energy to the masts of the proprotors. In a non-rotary flight mode, i.e. jet-powered airplane mode, the engine operates in a turbofan mode, wherein the engine does not provide torque of rotational energy to the masts. Instead, in the turbofan mode the engine provides forward thrust. When transitioning between proprotor-driven airplane mode and jet-powered airplane mode, a clutch is required to engage and disengage torque provided to the masts.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

Figure 1:
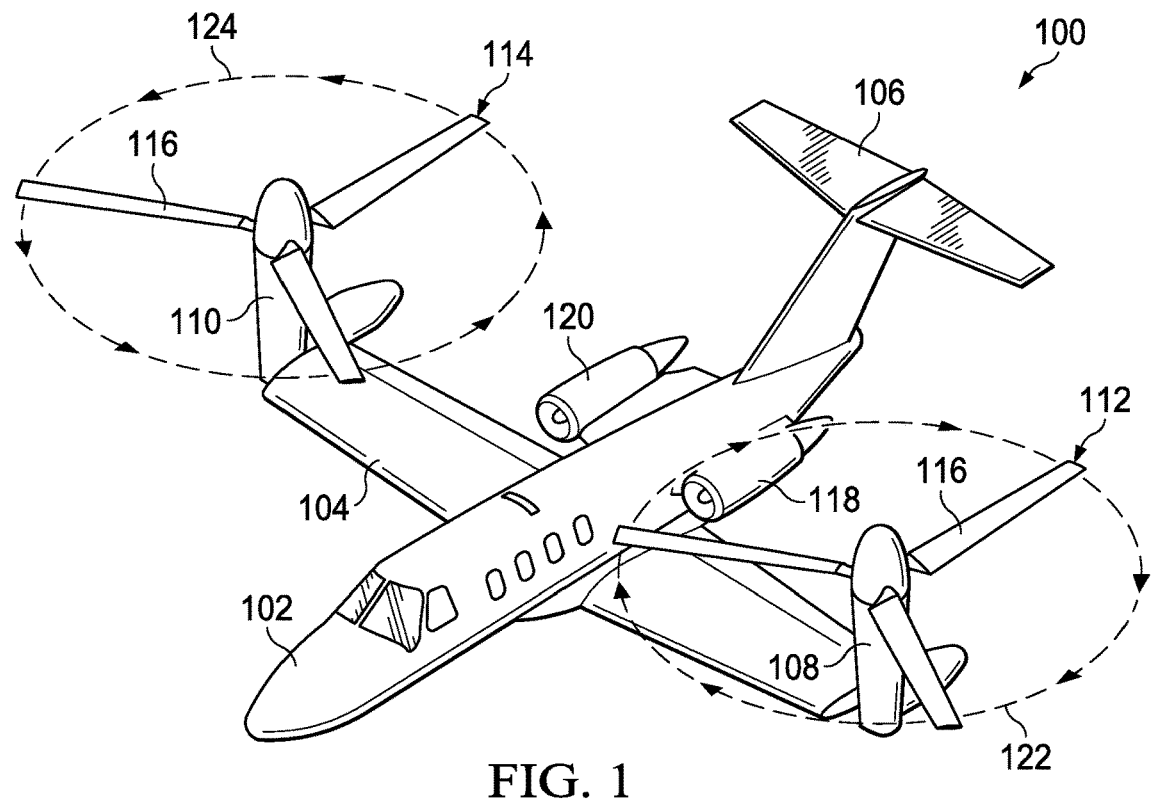
FIG. 1 is an oblique view of a tiltrotor aircraft in a helicopter mode.
Figure 2:
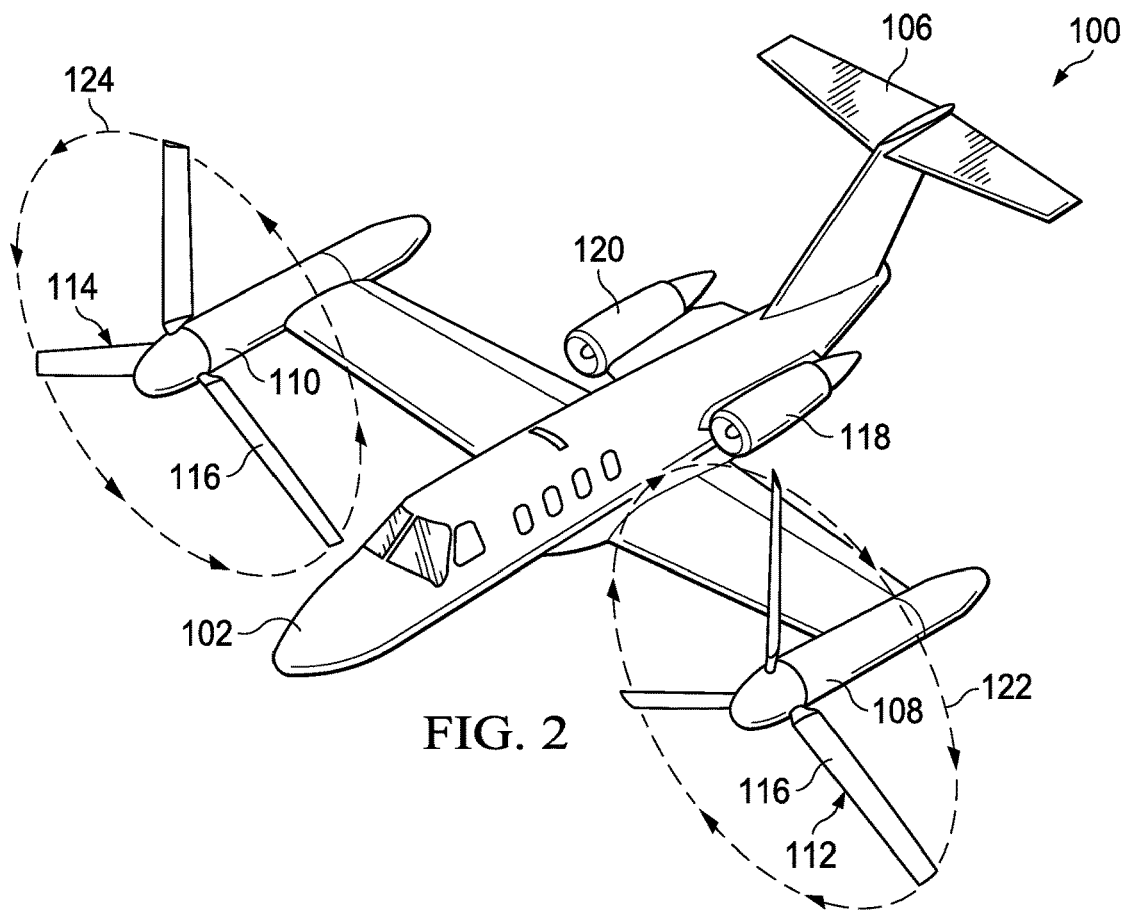
FIG. 2 is an oblique view of the tiltrotor aircraft of FIG. 1 in a proprotor-driven airplane mode.
Figure 3:
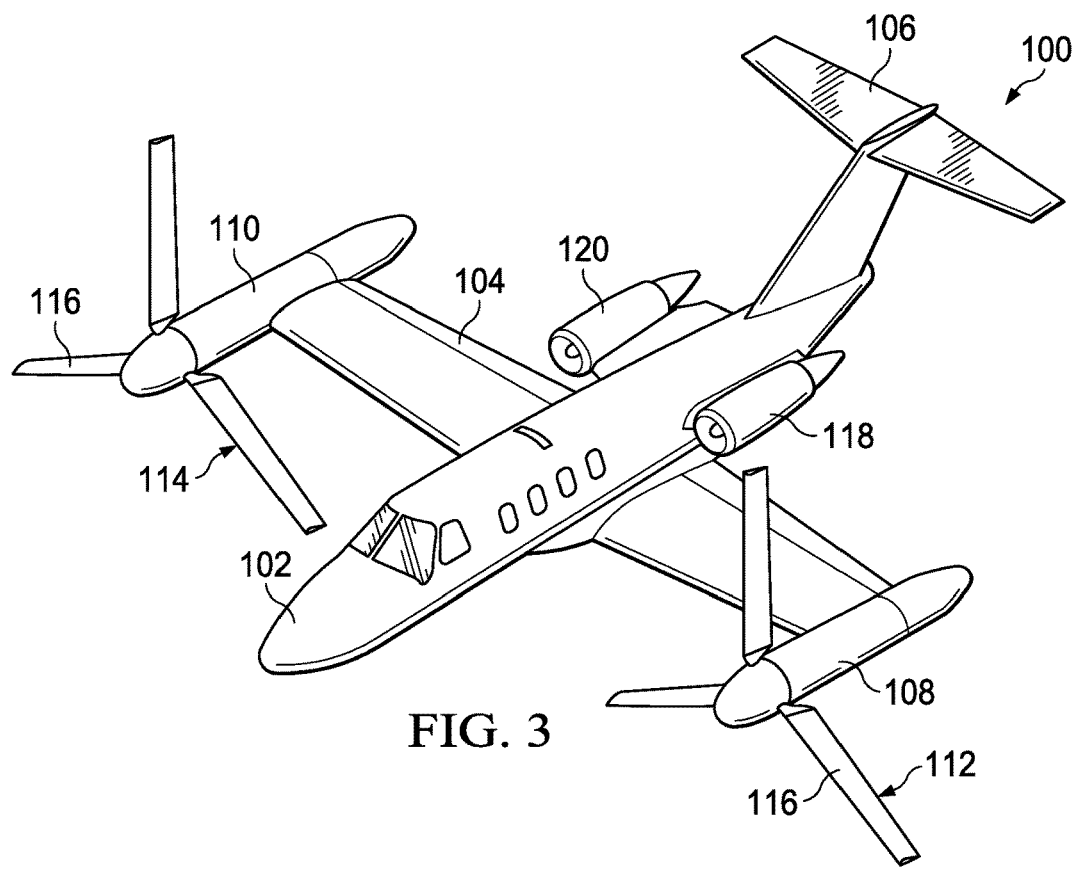
FIG. 3 is an oblique view of the tiltrotor aircraft of FIG. 1 in transition between proprotor-driven airplane mode and a jet-powered airplane mode.
Figure 4:
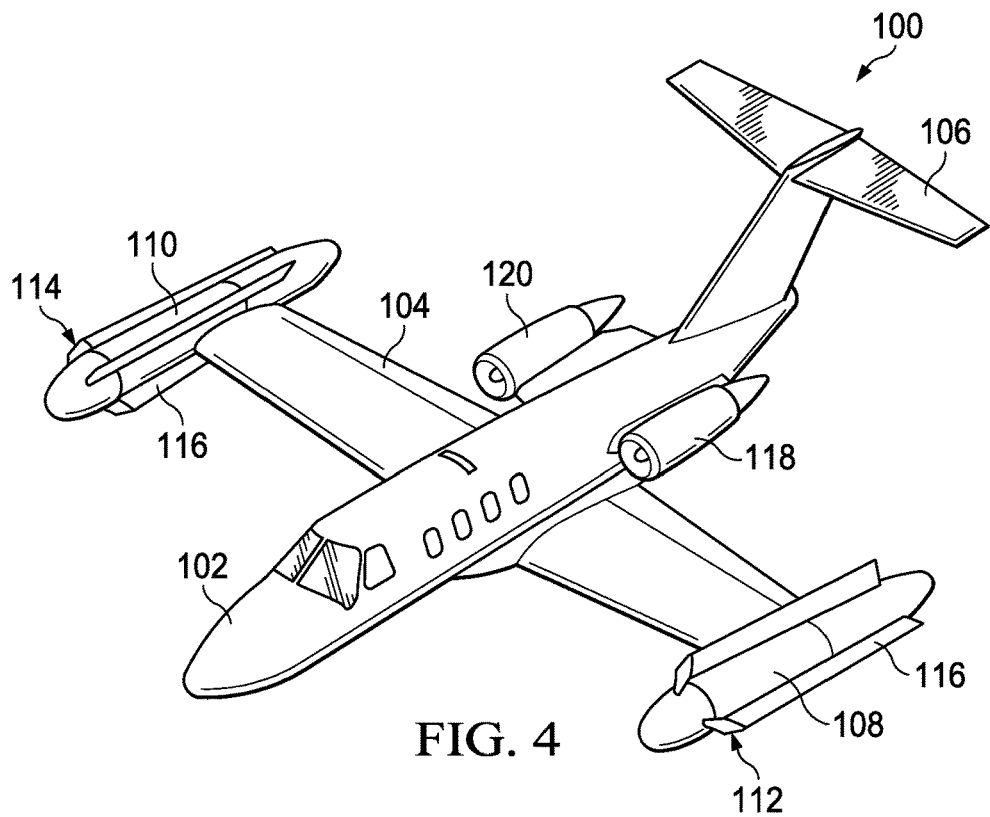
FIG. 4 is an oblique view of the tiltrotor aircraft of FIG. 1 in jet-powered airplane mode.

Referring to FIGS. 1-4, a tiltrotor aircraft 100 is illustrated. Tiltrotor aircraft 100 includes a fuselage 102, a wing 104, and a tail assembly 106 including control surfaces operable for horizontal and/or vertical stabilization during forward flight. Located proximate the outboard ends of wing 104 are nacelles 108, 110 that are rotatable relative to wing 104 between a generally vertical orientation, as best seen in FIG. 1, and a generally horizontal orientation, as best seen in FIGS. 2-4. Nacelles 108, 110 each house a portion of the drive system that is used to rotate proprotor assemblies 112, 114 respectively. Each proprotor assembly 112, 114 includes a plurality of proprotor blades 116 that are operable to be rotated, as best seen in FIGS. 1 and 2, operable to be feathered, as best seen in FIG. 3, and operable to be folded, as best seen in FIG. 4. In the illustrated embodiment, proprotor assembly 112 is rotated responsive to torque and rotational energy provided by engine 118, and proprotor assembly 114 is rotated responsive to torque and rotational energy provided by engine 120. It should be understood by those having ordinary skill in the art, however, that tiltrotor aircraft 100 may include an interconnected driveline configured to transmit torque from either engine 118, 120 to both proprotor assemblies 112, 114. Engines 118, 120 are located proximate an aft portion of fuselage 102. Engines 118, 120 are operable in a turboshaft mode, as best seen in FIGS. 1 and 2 and a turbofan mode, as best seen in FIGS. 3 and 4.

FIG. 1 illustrates tiltrotor aircraft 100 in VTOL or helicopter mode, in which proprotor assemblies 112, 114 are rotating in a substantially horizontal plane to provide a lifting thrust, such that tiltrotor aircraft 100 flies much like a conventional helicopter. In this configuration, engines 118, 120 are operable in turboshaft mode wherein hot combustion gases in each engine 118, 120 cause rotation of a power turbine coupled to an output shaft that is used to power the drive system coupled to the respective proprotor assemblies 112, 114. Thus, in this configuration, tiltrotor aircraft 100 is considered to be in a rotary flight mode.

FIG. 2 illustrates tiltrotor aircraft 100 in proprotor-driven airplane mode, in which proprotor assemblies 112, 114 are rotating in a substantially vertical plane to provide a forward thrust, enabling wing 104 to provide a lifting force responsive to forward airspeed, such that tiltrotor aircraft 100 flies much like a conventional propeller-driven aircraft. In this configuration, engines 118, 120 are operable in the turboshaft mode, and tiltrotor aircraft 100 is considered to be in the rotary flight mode.

In the rotary flight mode of tiltrotor aircraft 100, proprotor assemblies 112, 114 rotate in opposite directions to provide torque balancing to tiltrotor aircraft 100. For example, when viewed from the front of tiltrotor aircraft 100 in proprotor forward flight mode (FIG. 2) or from the top in helicopter mode (FIG. 1), proprotor assembly 112 rotates clockwise, as indicated by motion arrows 122, and proprotor assembly 114 rotates counterclockwise, as indicated by motion arrows 124. In the illustrated embodiment, proprotor assemblies 112, 114 each include three proprotor blades 116 that are equally spaced apart circumferentially at approximately 120-degree intervals. It should be understood by those having ordinary skill in the art, however, that the proprotor assemblies of the present disclosure could have proprotor blades with other designs and other configurations including proprotor assemblies having any number of proprotor blades. In addition, it should be appreciated that tiltrotor aircraft 100 can be operated such that proprotor assemblies 112, 114 are selectively positioned between proprotor-driven airplane mode and helicopter mode, which can be referred to as a conversion flight mode.

FIG. 3 illustrates tiltrotor aircraft 100 in transition between proprotor-driven airplane mode and jet-powered airplane mode, in which engines 118, 120 have been disengaged from proprotor assemblies 112, 114 and proprotor blades 116 of proprotor assemblies 112, 114 have been feathered, or oriented to be streamlined in the direction of flight, such that proprotor blades 116 act as brakes to aerodynamically stop the rotation of proprotor assemblies 112, 114. In this configuration, engines 118, 120 are operable in turbofan mode wherein hot combustion gases in each engine 118, 120 cause rotation of a power turbine coupled to an output shaft that is used to power a turbofan that forces bypass air through a fan duct to create forward thrust, enabling wing 104 to provide a lifting force responsive to forward airspeed, such that tiltrotor aircraft 100 flies much like a conventional jet aircraft. Thus, in this configuration, tiltrotor aircraft 100 is considered to be in a non-rotary flight mode.

FIG. 4 illustrates tiltrotor aircraft 100 in jet-powered airplane mode, in which proprotor blades 116 of proprotor assemblies 112, 114 have been folded to be oriented substantially parallel to respective nacelle 108, 110 to minimize the drag force generated by proprotor blades 116. In this configuration, engines 118, 120 are operable in the turbofan mode, and tiltrotor aircraft 100 is considered to be in the non-rotary flight mode. The forward cruising speed of tiltrotor aircraft 100 can be significantly higher in jet-powered airplane mode versus proprotor-driven airplane mode as the forward airspeed induced proprotor aeroelastic instability is avoided.

Even though tiltrotor aircraft 100 has been described as having two engines 118, 120 fixed to fuselage 102 each operating one of proprotor assemblies 112, 114 in the rotary flight mode, it should be understood by those having ordinary skill in the art that other engine arrangements are possible and are considered to be within the scope of the present disclosure including, for example, having a single engine that provides torque and rotational energy to both of proprotor assemblies 112, 114. Or the engines could be located under wing 104 rather than fixed to fuselage 102. In addition, even though proprotor assemblies 112, 114 are illustrated in the context of tiltrotor aircraft 100, it should be understood by those having ordinary skill in the art that the proprotor assemblies disclosed herein can be implemented on other tiltrotor aircraft including, for example, quad tiltrotor aircraft having an additional wing member aft of wing 104, unmanned tiltrotor aircraft or other tiltrotor aircraft configurations.

Engagement of proprotor assemblies 112, 114 during the transition between non-rotary flight mode and rotary flight mode is made possible by a clutch 200, as illustrated in FIGS. 5-9. While this disclosure describes clutch 200 as being configured for use with a jet engine in a turboshaft mode, it should be understood that clutch 200 could be configured for use in other applications.

In one embodiment, tiltrotor aircraft 100 includes two clutches 200, a first between engine 118 and proprotor assembly 112 and a second between engine 120 and proprotor assembly 114. However, alternative embodiments are possible. For example, the outputs of engines 118, 120 may be combined to a single output shaft that is routed through a single clutch 200. Regardless of the number of clutches 200 they should operate in substantially the same manner. As such, this disclosure will describe clutch 200 in relation to engine 118 and proprotor assembly 112 with the understanding that second clutch 200 between engine 120 and proprotor assembly 114 is mechanically identical.

The following description will first explain the procedure for transitioning from non-rotary flight mode to rotary flight mode, and then back to non-rotary flight mode. Because the transition from non-rotary flight mode to rotary flight mode occurs while tiltrotor aircraft 100 is in flight, precisely matching the rotational velocity of a driven output shown as a lock shaft 202 coupled to proprotor assembly 112 with the rotational velocity of a drive input shown as a drive gear 204 coupled to engine 118 is exceptionally difficult. The process begins by extending proprotor blades 116 from the stored position shown in FIG. 4, to the extended position shown in FIG. 3. Next, proprotor blades 116 are pitched so that the air passing thereby causes proprotor assembly 112 to rotate as shown in FIG. 2. The rotational velocity of proprotor assembly 112 is monitored via a speed sensor (not shown), and that information is transmitted in real-time to an onboard computer. The computer automatically adjusts the pitch of proprotor blades 116 to either increase or decrease the rotational velocity of proprotor assembly 112, and therefore, the rotational velocity of lock shaft 202. When the rotational velocity of lock shaft 202 is within an acceptable range of the rotational velocity of drive gear 204, clutch 200 may begin engagement. The acceptable range is preferably approximately within 1%. However, the range may vary depending on velocities, loads, and materials used. Because the rotational velocities are not identical, the initial engagement uses a friction system that will allow some relative movement prior to full engagement. This is accomplished via a synchronizer 206.

Figure 5:
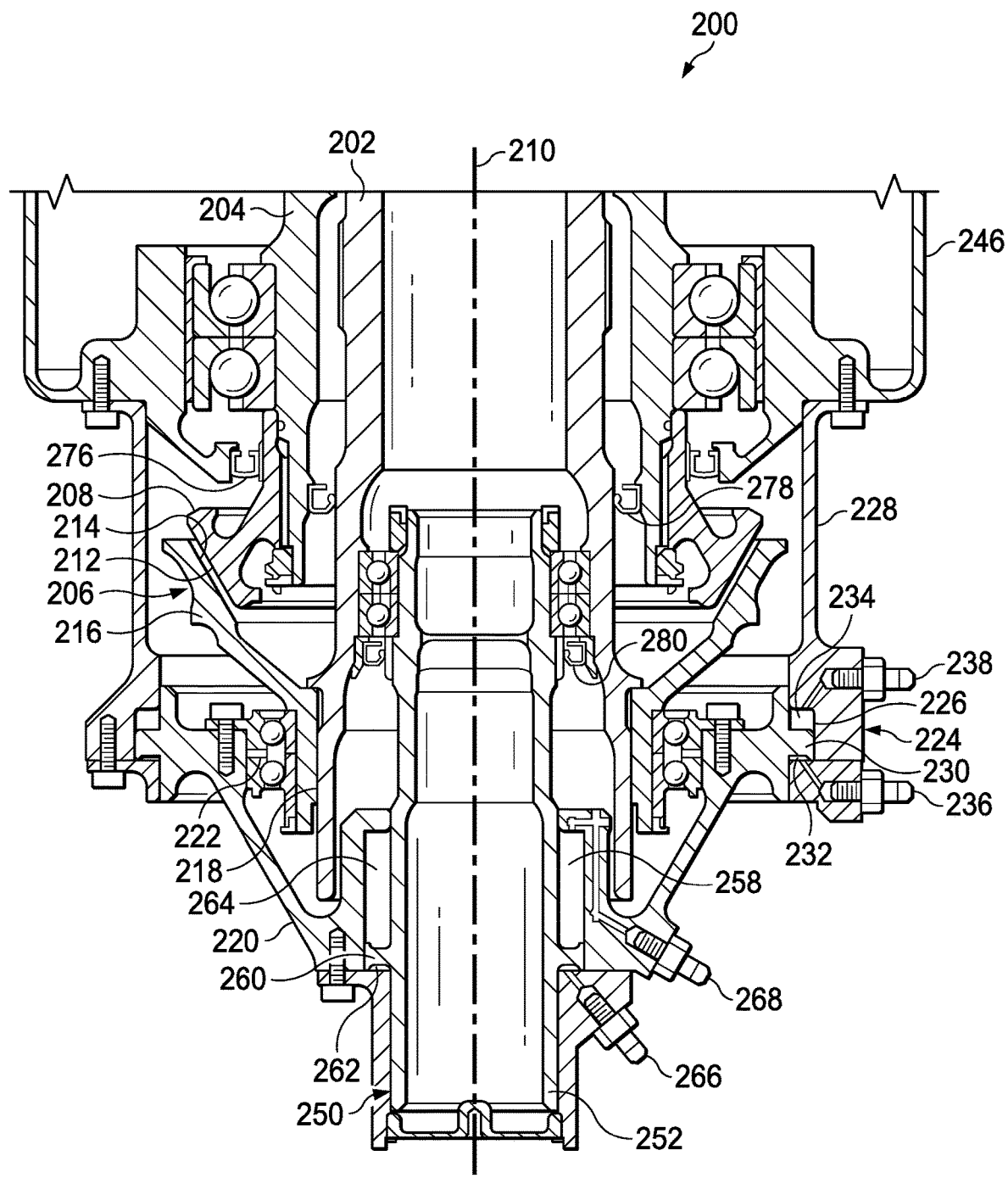
FIG. 5 is a cross-sectional view of a portion of a clutch according to this disclosure.

FIG. 5 provides a detailed view of the components of clutch 200, including synchronizer 206 and a locking mechanism 250 (in a disengaged state). FIGS. 6-9 illustrate clutch 200 progressing through the steps of the engagement process, i.e., transitioning from non-rotary flight mode to rotary flight mode, beginning with complete disengagement in FIG. 6, engagement of synchronizer 206 in FIG. 7, engagement of locking mechanism 250 in FIG. 8, and disengagement of synchronizer 206 in FIG. 9.

As shown in FIGS. 5-9, synchronizer 206 includes a first friction element shown as an inner cone 208 coupled for common rotation with drive gear 204 about a central axis 210. Inner cone 208 includes a frusto-conical outer friction surface 212. Frusto-conical outer friction surface 212 is configured for engagement with a frusto-conical inner friction surface 214 of a second friction element shown as an outer cone 216. Outer cone 216 is coupled for common rotation with lock shaft 202 about central axis 210. The coupling between outer cone 216 and lock shaft 202 is via complementary splines 218. Complementary splines 218 prevent relative rotation between outer cone 216 and lock shaft 202, but allow for relative translation therebetween along central axis 210. Outer cone 216 is coupled to an inner synchronizer cover 220 via a synchronizer radial bearing 222. Outer cone 216 is free to rotate about central axis 210 within inner synchronizer cover 220 but translation relative thereto is not permitted. Engagement between inner cone 208 and outer cone 216 is controlled by a synchronizer piston 224. Synchronizer piston 224 includes a chamber 226 defined by an inner surface of an outer synchronizer cover 228 and an outer surface of inner synchronizer cover 220. Inner synchronizer cover 220 also includes a rim 230 extending into chamber 226. Chamber 226 is hydraulically separated by rim 230 into an engagement side 232 and a disengagement side 234. Engagement side 232 of chamber 226 is connected to a hydraulic system (not shown) via an engagement port 236, and disengagement side 234 of chamber 226 is connected to the hydraulic system via a disengagement port 238.

Figure 6:
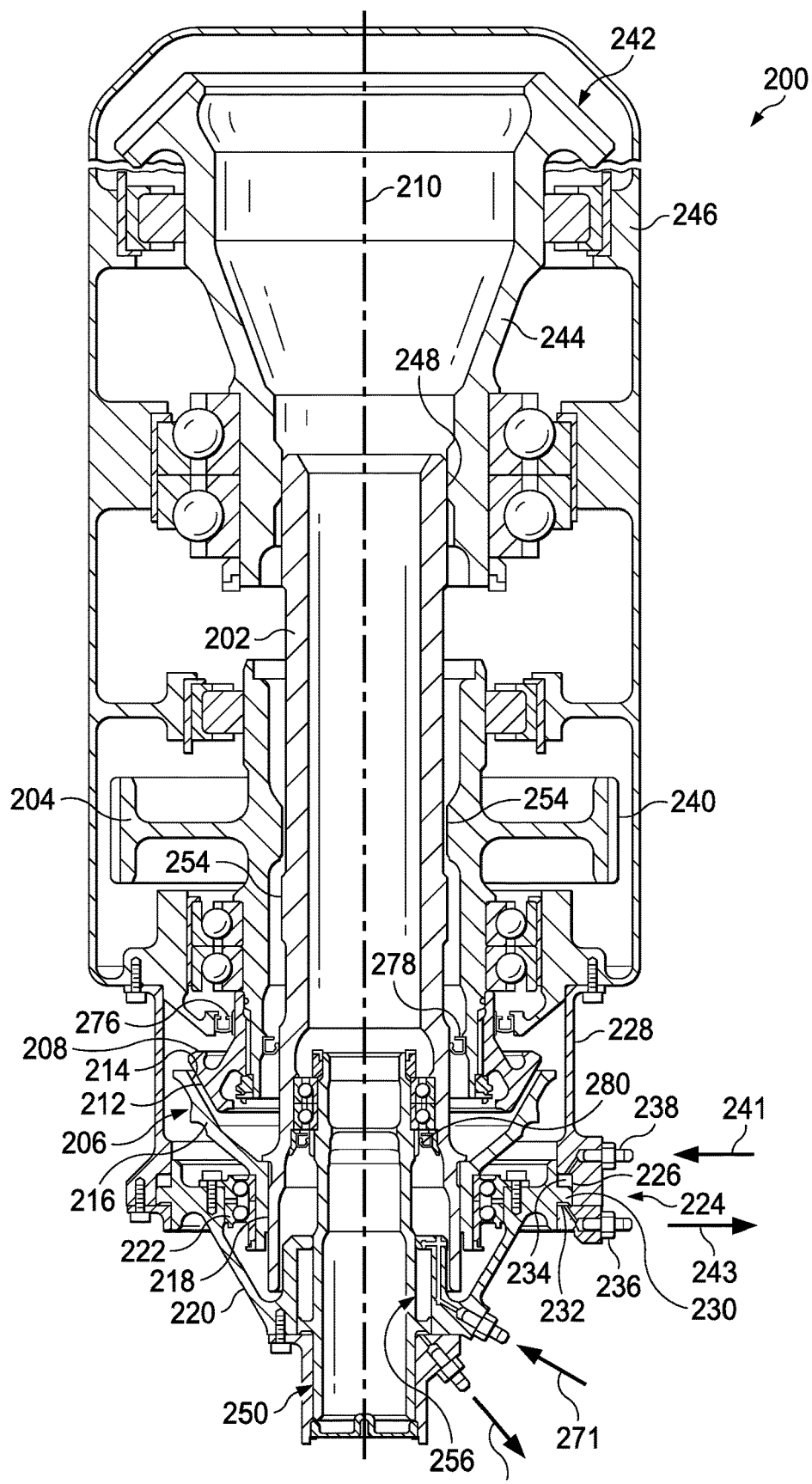
FIG. 6 is a cross-sectional view of the clutch of FIG. 5, wherein the clutch is disengaged.
Figure 7:
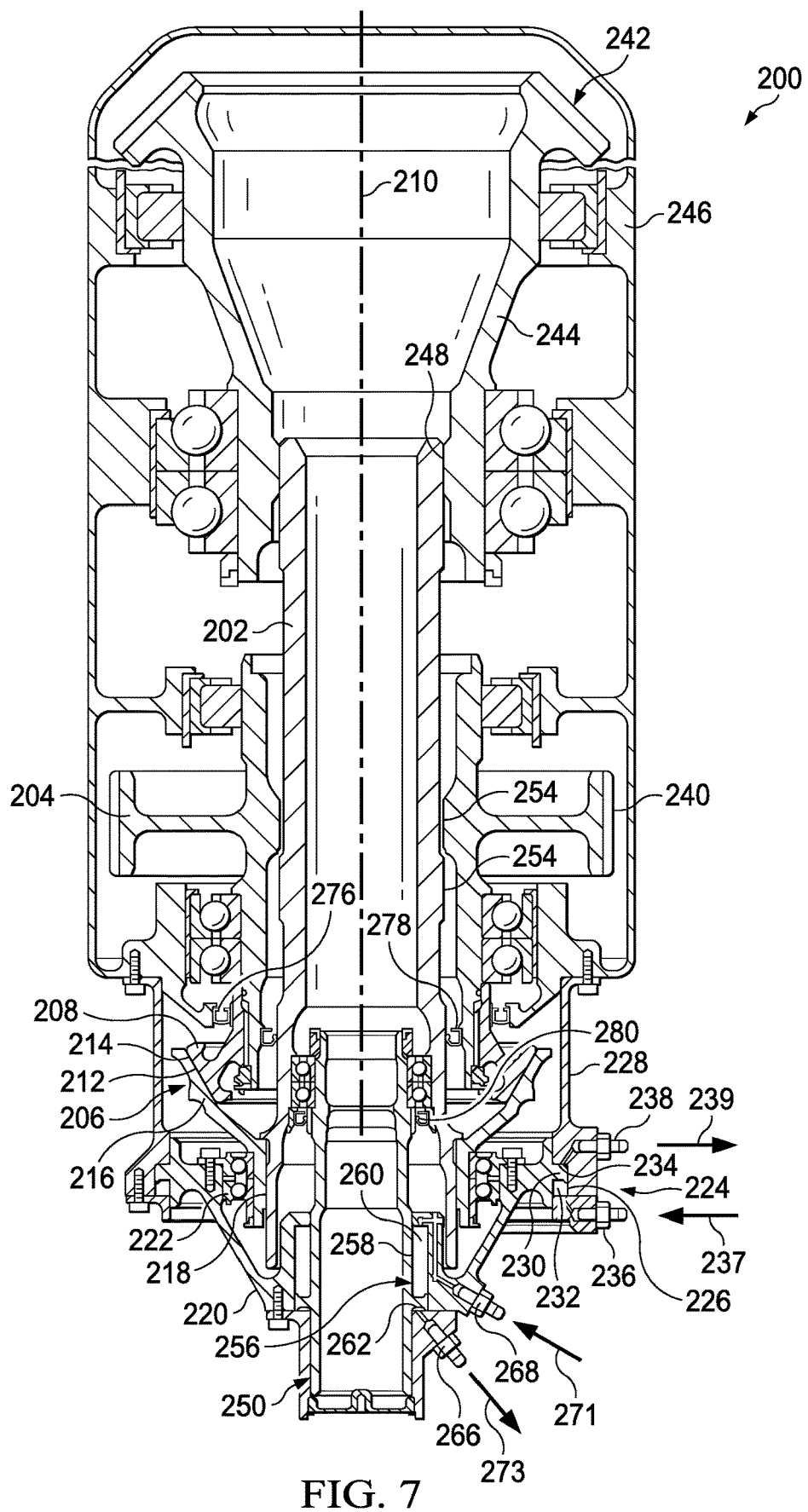
FIG. 7 is a cross-sectional view of the clutch of FIG. 5, wherein a synchronizer of the clutch is engaged.

As shown in FIG. 7, the addition of hydraulic fluid through engagement port 236 and the withdrawal of hydraulic fluid through disengagement port 238, represented by arrows 237 and 239, respectively, causes greater pressure on engagement side 232 of chamber 226, thereby causing translation of inner synchronizer cover 220 along central axis 210 toward inner cone 208. The translation of inner synchronizer cover 220 towards inner cone 208 also causes outer cone 216 and lock shaft 202 to translate along central axis 210 until inner friction surface 214 makes contact with outer friction surface 212. Upon initial contact between outer friction surface 212 and inner friction surface 214, there will be a brief period of rotation relative to each other. Follow the brief relative rotation, friction between friction surfaces 212 and 214 will create a firm connection which prevents relative rotation therebetween. At this point, drive gear 204 and lock shaft 202 are synchronous, and the torque path flows from engine 118 through drive gear 204 (the portions of the drivetrain from engine 118 to drive gear 204 are omitted, but the omitted portion terminates in a gear that engages drive gear 204 via gear teeth 240), inner cone 208, outer cone 216, lock shaft 202, and out through a transmission 242 to proprotor assembly 112. FIGS. 6-9 only show a bevel gear 244 of transmission 242 housed within a transmission case 246, and for simplicity, omit the rest of the drivetrain between bevel gear 244 and proprotor assembly 112, as the details of this structure is not relevant to the operation of clutch 200. Bevel gear 244 is coupled in rotation with lock shaft 202 via complementary splines 248. While complementary splines 248 prevent relative rotation between lock shaft 202 and bevel gear 244, they allow lock shaft 202 to move axially along central axis 210 relative to bevel gear 244. The only aspect of the omitted portion of the drivetrain that is relevant to the operation of clutch 200 is that proprotor assembly 112 and lock shaft 202 are coupled in rotation together. As such, torque and rotational motion received by lock shaft 202 is transferred to proprotor assembly 112, and vice versa. With synchronizer 206 maintaining synchronicity of lock shaft 202 with drive gear 204, the two may be locked together.

Figure 8:
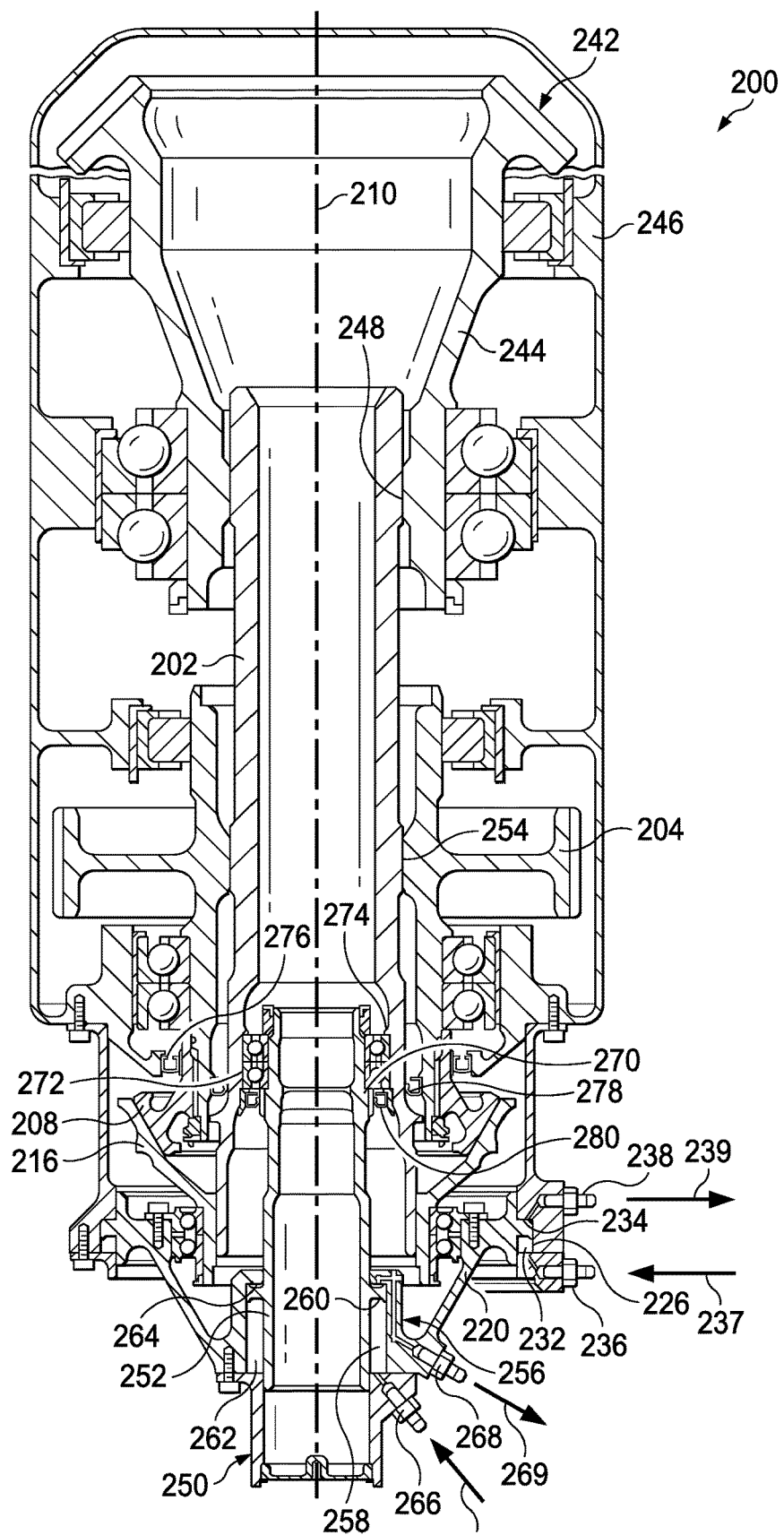
FIG. 8 is a cross-sectional view of the clutch of FIG. 5, wherein the synchronizer and a locking mechanism are both engaged.

Referring now to FIG. 8, engagement of locking mechanism 250 is illustrated. Locking mechanism 250 includes a plunger 252 that pushes lock shaft 202 into direct connection with drive gear 204. The direct connection between lock shaft 202 and drive gear 204 is via complementary splines 254. Plunger 252 is actuated by a lock shaft piston 256, similar in operation to synchronizer piston 224. Lock shaft piston 256 includes a chamber 258 defined by an inner surface of inner synchronizer cover 220 and an outer surface of plunger 252. Plunger 252 includes a rim 260 extending into chamber 258. Chamber 258 is hydraulically separated by rim 260 into an engagement side 262 and a disengagement side 264. Engagement side 262 of chamber 258 is connected to a hydraulic system (not shown) via an engagement port 266 and disengagement side 264 of chamber 258 is connected to the hydraulic system via a disengagement port 268. The addition of hydraulic fluid through engagement port 266 and the withdrawal of hydraulic fluid through disengagement port 268, represented by arrows 267 and 269, respectively, causes greater pressure on engagement side 262 of chamber 258, thereby causing translation of plunger 252 along central axis 210 toward lock shaft 202. Plunger 252 includes a shoulder 270 extending from an external surface thereof which bears against a lock shaft radial bearing 272. And lock shaft radial bearing 272 bears against a shoulder 274 extending from an internal surface of lock shaft 202. As such, in addition to facilitating the rotation of lock shaft 202 about non-rotating plunger 252, lock shaft radial bearing 272 also transfers the axial force necessary to advance lock shaft 202 along central axis 210 so that complementary splines 254 are fully engaged. At this point, lock shaft 202 and drive gear 204 are locked, and the torque path flows from engine 118 through drive gear 204, lock shaft 202, and out through transmission 242 to proprotor assembly 112. In addition, at this stage of engagement, synchronizer 206 is still connected, as such, torque may still flow from engine 118 through drive gear 204, inner cone 208, outer cone 216, lock shaft 202, transmission 242, and proprotor assembly 112. With locking mechanism 250 engaged, there is no need for synchronizer 206 to remain engaged.

Figure 9:
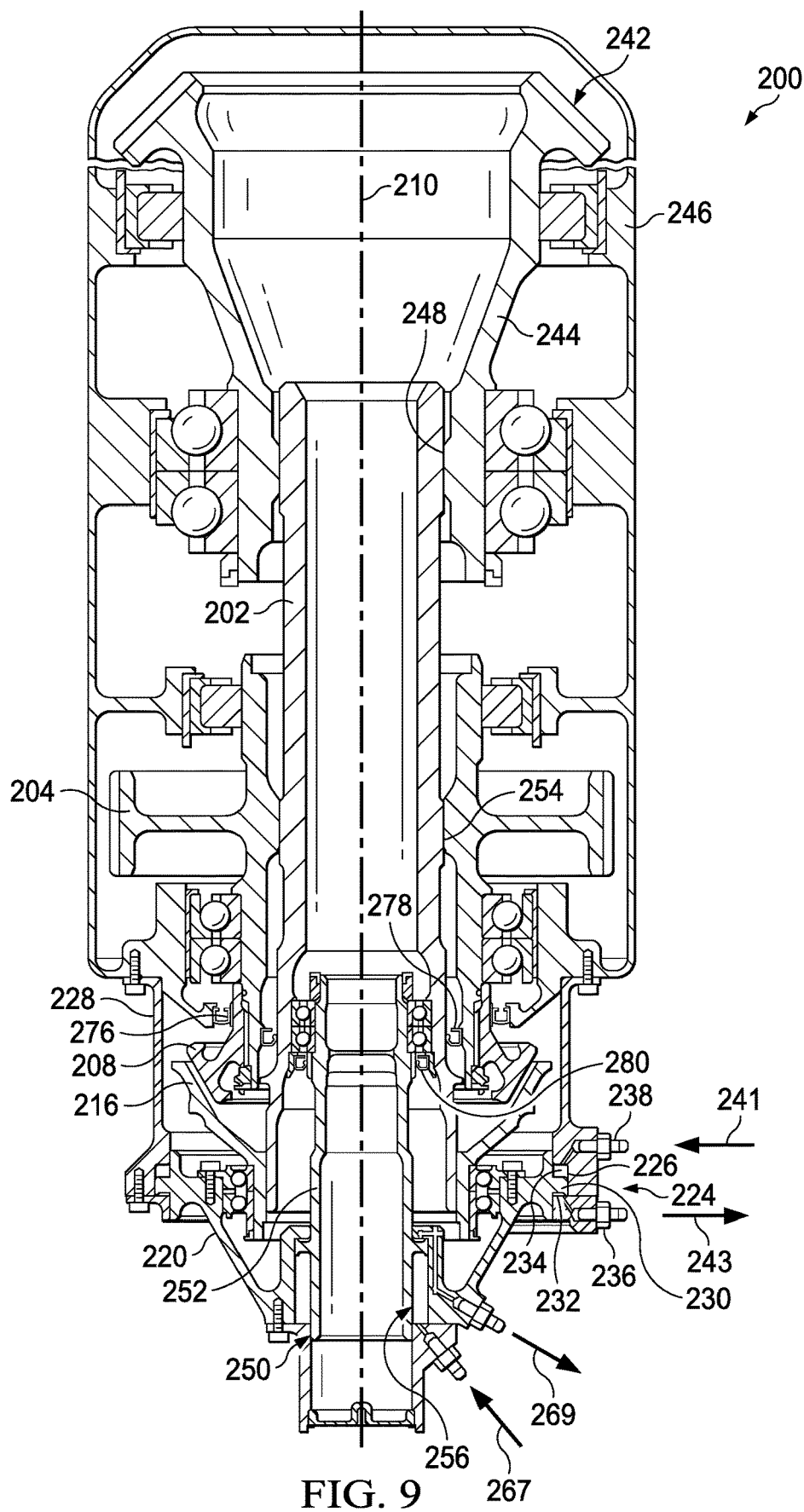
FIG. 9 is a cross-sectional view of the clutch of FIG. 5, wherein the synchronizer is disengaged and the locking mechanism is engaged.

Referring now to FIG. 9, disengagement of synchronizer 206 is illustrated. Disengagement of synchronizer 206 is accomplished by reversing the pressure in synchronizer piston 224 by pumping hydraulic fluid into disengagement side 234 of chamber 226 while hydraulic fluid escapes engagement side 232 through engagement port 236, as represented by arrows 241 and 243, respectively. The resulting pressure differential pushes inner synchronizer cover 220 away from inner cone 208, thereby separating outer cone 216 from inner cone 208. This state of clutch 200 engagement, with locking mechanism 250 connecting lock shaft 202 to drive gear 204, and with synchronizer 206 disengaged is the preferred configuration for rotary flight mode.

When transitioning from rotary flight mode to non-rotary flight mode, the process is reversed. First, synchronizer 206 is reengaged by reversing the pressure in synchronizer piston 224. As shown in FIG. 8, the addition of hydraulic fluid through engagement port 236 and the withdrawal of hydraulic fluid through disengagement port 238, represented by arrows 237 and 239, respectively, causes greater pressure on engagement side 232 of chamber 226, thereby causing translation of inner synchronizer cover 220 along central axis 210 toward inner cone 208. The translation of inner synchronizer cover 220 towards inner cone 208 also causes outer cone 216 and lock shaft 202 to translate along central axis 210 until inner friction surface 214 makes contact with outer friction surface 212.

Next, similar to the process of speed matching lock shaft 202 to drive gear 204 by feathering proprotor blades 116, during disengagement of lock shaft 202 from drive gear 204, the torque load between lock shaft 202 and drive gear 204 should be as close to zero as possible. Accordingly, the torque load on the connection between lock shaft 202 and drive gear 204 is monitored via torque sensors (not shown) and that information is transmitted in real-time to the onboard computer (not shown). The computer automatically adjusts the pitch of proprotor blades 116 to zero out the torque load between lock shaft 202 and drive gear 204. When the torque load is within an acceptable range, locking mechanism 250 may be disengaged. Disengagement of locking mechanism 250 is performed by reversing the pressurization of lock shaft piston 256. As shown in FIG. 7, this is accomplished by pumping additional hydraulic fluid through disengagement port 268 into disengagement side 260 of chamber 258 while hydraulic fluid escapes engagement side 262 through engagement port 266, as represented by arrows 271 and 273, respectively. The resulting pressure differential pushes plunger 252 away from bevel gear 244, thereby separating lock shaft 202 from drive gear 204.

After disengaging locking mechanism 250, synchronizer 206 is disengaged by reversing the pressurization of synchronizer piston 224. As shown in FIG. 6, this is accomplished by pumping hydraulic fluid into disengagement side 234 of chamber 226 while hydraulic fluid escapes engagement side 232 through engagement port 236, as represented by arrows 241 and 243, respectively. The resulting pressure differential pushes inner synchronizer cover 220 away from inner cone 208, thereby separating outer cone 216 from inner cone 208. After disengagement of synchronizer 206, proprotor assemblies 112, 114 may be arrested and proprotor blades 116 folded for non-rotary flight mode, as shown in FIGS. 3 and 4.

Because synchronizer 206 is a friction system, it is preferable to have inner cone 208 and outer cone 216 physically separated from transmission 242 so that the debris created by the friction between outer friction surface 212 and inner friction surface 214 does not contaminate the transmission fluid contained within transmission case 246. This separation of synchronizer 206 from transmission 242 is maintained by three rotary seals. First rotary seal 276 is located between non-rotating transmission case 246 and rotating inner cone 208. First rotary seal 276 could alternatively be located between transmission case 246 and drive gear 204, thereby enabling replacement of a worn inner cone 208 without draining the transmission fluid from transmission 242. Second rotary seal 278 is located between drive gear 204 and lock shaft 202. Third rotary seal 280 is located between lock shaft 202 and non-rotating plunger 252.

While synchronizer 206 is described as a dry cone clutch, other embodiments are possible. For example, synchronizer 206 could be a wet cone clutch wherein the clutch fluid is separated from the transmission fluid by rotary seals 276, 278, 280. Moreover, synchronizer 206 may comprise a single-plate or multi-plate dry or wet clutch.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A clutch, comprising:
   a synchronizer, comprising:
      a first friction element coupled to a drive input, the first friction element including a first friction surface;

a second friction element coupled to a driven output, the second friction element including a second friction surface; and
a first piston configured to cause relative translation between the first friction element and the second friction element; and
a locking mechanism, comprising:
a plunger coupled to the driven output; and
a second piston configured to cause relative translation between the driven output and the drive input;
wherein the first friction surface and the second friction surface of the synchronizer are separated from transmission fluid by a first rotary seal.

2. The clutch of claim 1, wherein the second friction element is configured to translate relative to the driven output.

3. The clutch of claim 1, wherein the driven output is rotatably coupled to the plunger.

4. The clutch of claim 1, wherein the first friction element comprises an inner cone, the first friction surface comprises a frusto-conical inner friction surface, the second friction element comprises an outer cone, and the second friction surface comprises a frusto-conical outer friction surface.

5. The clutch of claim 1, further comprising:
a second rotary seal separating the first friction surface and the second friction surface from the transmission fluid.

6. The clutch of claim 5, further comprising:
a third rotary seal separating the first friction surface and the second friction surface from the transmission fluid.

7. The clutch of claim 6, wherein the first rotary seal is located between a case and the drive input, the second rotary seal is located between the drive input and the driven output, and the third rotary seal is located between the driven output and the plunger.

8. The clutch of claim 1, wherein the drive input and the driven output have complementary splines configured to engage each other in response to translation of the driven output caused by the second piston.

9. The clutch of claim 1, wherein the driven output is coupled for common rotation with a transmission element, but the driven output may translate relative to the transmission element.

* * * * *